United States Patent
Hiramatsu et al.

(10) Patent No.: US 10,427,506 B2
(45) Date of Patent: Oct. 1, 2019

(54) SUNROOF DEVICE

(71) Applicant: AISIN SEIKI KABUSHISIKI KAISHA, Kariya-shi, Aichi-ken (JP)

(72) Inventors: Shinichi Hiramatsu, Chiryu (JP); Shinji Sakai, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 15/771,231

(22) PCT Filed: Nov. 2, 2016

(86) PCT No.: PCT/JP2016/082691
§ 371 (c)(1),
(2) Date: Apr. 27, 2018

(87) PCT Pub. No.: WO2017/078106
PCT Pub. Date: May 11, 2017

(65) Prior Publication Data
US 2019/0054807 A1 Feb. 21, 2019

(30) Foreign Application Priority Data
Nov. 6, 2015 (JP) .................................. 2015-218964

(51) Int. Cl.
*B60J 7/043* (2006.01)
*B60J 7/057* (2006.01)

(52) U.S. Cl.
CPC .............. *B60J 7/043* (2013.01); *B60J 7/057* (2013.01)

(58) Field of Classification Search
CPC .................................. B60J 7/043; B60J 7/057
(Continued)

(56) References Cited

U.S. PATENT DOCUMENTS

| 6,916,064 B2* | 7/2005 | Bohm | ........................ B60J 7/02 296/216.04 |
| 8,757,710 B2* | 6/2014 | Nellen | ................... B60J 7/0015 296/214 |

(Continued)

FOREIGN PATENT DOCUMENTS

| EP | 2 607 124 B1 | 10/2014 |
| JP | 2003-80947 | 3/2003 |

(Continued)

*Primary Examiner* — Dennis H Pedder
(74) *Attorney, Agent, or Firm* — Finnegan, Henderson, Farabow, Garrett & Dunner, LLP (57) ABSTRACT

A sunroof device includes support members, which are attached to a movable panel, sliding members, which are slidable along guide rails, movable members, rotating bodies, two front-side rack gears, and two rear-side rack gears. Each movable member is fixed to one of the sliding members and supported by the corresponding one of the support members to be movable. Front and rear-side rotating bodies are respectively supported by front and rear portions of the movable panel. The front-side rack gears are coupled to the front-side rotating body such that the distances from the center of the movable panel to the front ends of the two movable members are equal. The rear-side rack gears are coupled to the rear-side rotating body such that distances from the center of the movable panel to the rear ends of the two movable members are equal.

5 Claims, 4 Drawing Sheets (58) Field of Classification Search
USPC .......................................... 296/216.08, 223
See application file for complete search history.

(56) References Cited

U.S. PATENT DOCUMENTS

2006/0080903 A1     4/2006   Grimm et al.
2014/0008941 A1     1/2014   Manders et al.

FOREIGN PATENT DOCUMENTS

| JP | 2003-127669 | 5/2003 |
| JP | 2003-211968 | 7/2003 |

\* cited by examiner

SUNROOF DEVICE

CROSS-REFERENCE TO RELATED APPLICATIONS

This application is a national phase application of International Application No. PCT/JP2016/082691, filed Nov. 2, 2016, and claims the priority of Japanese Application No. 2015-218964, filed Nov. 6, 2015, the content of both of which is incorporated herein by reference.

TECHNICAL FIELD

The present invention relates to a sunroof device.

BACKGROUND ART

Patent Document 1, for example, describes a conventional sunroof device. The sunroof device disclosed in this publication includes two guide rails, a movable panel, and two pivot arms. At least parts of guide rails are curved in correspondence with the design of the roof of the vehicle and extend non-parallel to each other. The pivot arms extend along opposite side edges of the movable panel. The rear end of each pivot arm is coupled to the movable panel in a manner pivotal about the axis extending in the height direction of the vehicle. A guide portion is secured to the movable panel. The front end of each pivot arm is coupled to the guide portion to be movable in the width direction of the vehicle. The sunroof device also includes bent members, each of which has a front end in which a guide shoe is arranged. The guide shoes are attached to the pivot arms to be movable along the guide rails.

The guide shoes of the bent members move along the guide rails, thus moving the pivot arms. This moves the movable panel to selectively open and close the opening in the roof. At this time, the guide shoes of the bent members are displaced in the vehicle width direction in correspondence with the shapes of the guide rails. At the same time, the pivot arms pivot about the axes while moving the front ends of the pivot arms along the guide portion in the vehicle width direction. This absorbs the displacement of the guide shoes in the vehicle width direction.

As has been described, as described in Patent Document 1, the front ends of the pivot arms are movable along the guide portion of the movable panel in the vehicle width direction. The movable panel may, for example, receive external force in the vehicle width direction during its opening or closing action. In this case, the movable panel is likely to be displaced in the vehicle width direction. That is, the maintenance of the center of the movable panel in the vehicle width direction is likely to be hampered.

PRIOR ART DOCUMENT

Patent Document

Patent Document 1: European Patent No. 2 607 124 B1

SUMMARY OF THE INVENTION

Problems that the Invention is to Solve

Accordingly, it is an objective of the present invention to provide a sunroof device capable of reliably maintaining the center of a movable panel in the width direction of a vehicle.

Means for Solving the Problems

To achieve the foregoing objective and in accordance with a first aspect of the present invention, a sunroof device is provided that includes two guide rails, two sliding members, two support members, movable members, a front-side rotating body and a rear-side rotating body, two front-side transmission members, and two rear-side transmission members. The guide rails are arranged in opposite edges of an opening formed in a roof of a vehicle in a width direction of the vehicle such that at least parts of the guide rails are non-parallel with each other. The sliding members are slidable along the guide rails. The support members are respectively attached to a front portion and a rear portion of a movable panel that selectively opens and closes the opening. Each movable members is fixed to one of the sliding members. Each movable member has a front end and a rear end that are supported by the corresponding one of the support members to be movable in the vehicle width direction. The front-side rotating body and a rear-side rotating body are respectively rotationally supported by the front portion and the rear portion of the movable panel. Each front-side transmission member has an end fixed to a front end of one of the movable members and another end coupled to the front-side rotating body such that distances from a center of the movable panel in the vehicle width direction to the respective front ends of the two movable members are equal to each other. Each rear-side transmission member has an end fixed to a rear end of one of the movable members and another end coupled to the rear-side rotating body such that distances from the center of the movable panel in the vehicle width direction to the respective rear ends of the two movable members are equal to each other.

MODES FOR CARRYING OUT THE INVENTION

A sunroof device according to one embodiment of the present invention will now be described. In the following description, the front-rear direction of the vehicle will be referred to as the front-rear direction. The upper and lower sides with respect to the height direction of the vehicle will be referred to as the upper side and the lower side, respectively. Further, the side closer to the center of the vehicle with respect to the vehicle width direction will be referred to as the inner side, and the side closer to the outside with respect to the vehicle width direction will be referred to as the outer side.

Figure 1A:
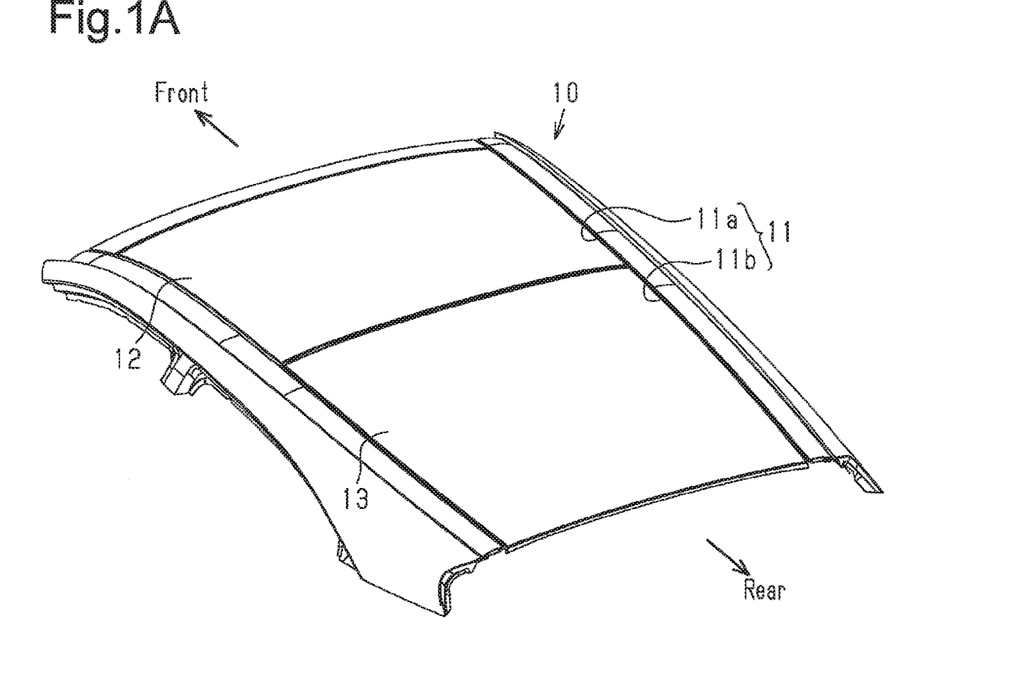
FIG. 1A is a perspective view illustrating a closed state of a roof that employs a sunroof device according to one embodiment of the present invention.
Figure 1B:
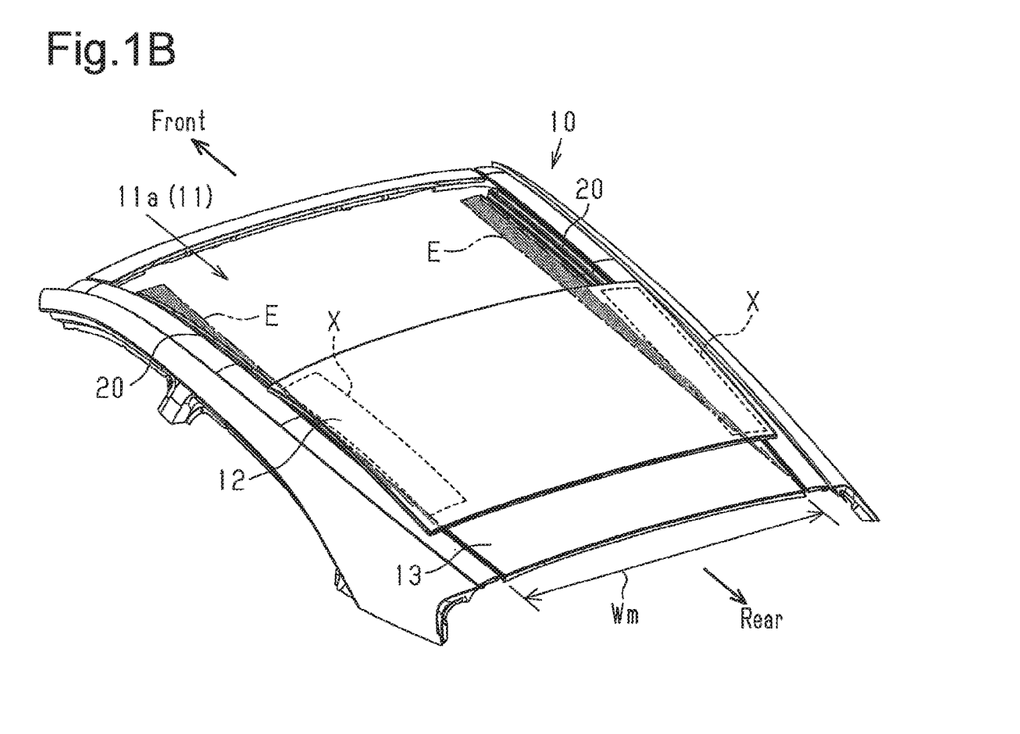
FIG. 1B is a perspective view illustrating an open state of the roof.

As shown in FIGS. 1A and 1B, a substantially rectangular opening 11 is formed in the roof 10 of a vehicle such as an automobile. A movable panel 12 and a fixed panel 13 are plate members made of, for example, glass or plastic and are fixed to the roof 10. The movable panel 12 is capable of selectively opening and closing a front-side opening section 11a of the opening 11. The movable panel 12 is capable of tilt-up operation of raising the rear portion of the movable panel 12 about the front portion of the movable panel 12 as the support point. The movable panel 12 is also capable of sliding in the front-rear direction. The opening-closing operation of the front-side opening section 11a by the movable panel 12 employs an outer-sliding style, in which the movable panel 12 slides while being maintained in a tilt-up state. The fixed panel 13 always closes a rear-side opening section 11b of the opening 11.

The roof 10 is designed to become gradually larger in the width direction toward the front side. Correspondingly, the opening 11 also becomes gradually larger in the width direction gradually toward the front side. That is, the roof 10 is formed such that, on the rear end of the roof 10, or on the rear end of the fixed panel 13, the dimension of the roof 10 in the vehicle width direction is the minimum dimension Wm. The opening 11 is also formed such that the opening width is minimum in the vehicle width direction on the rear end of the opening 11. The opening 11 thus has an opening amount greater than that of an opening having an opening width uniform from its rear end, which corresponds to the minimum opening width, to its front end. FIG. 1B illustrates the enlarged areas E of the opening amount of the opening 11 as compared with the opening with a constant opening width. As shown in FIG. 1B, the opening amount of the opening 11 becomes gradually greater in the width direction toward the front side. The movable panel 12 and the fixed panel 13 are each molded substantially like an isosceles trapezoid having a front-side width greater than a rear-side width in correspondence with the front-side opening section 11a and the rear-side opening section 11b.

Two guide rails 20 are arranged in and fixed to the opposite edges of the opening 11 in the vehicle width direction. The guide rails 20 are each formed by, for example, an extruded aluminum alloy member. The guide rails 20 extend in the front-rear direction and have uniform cross sections at any longitudinal position. In correspondence with the design of the roof 10, the guide rails 20 extend non-parallel to each other such that the distance between the guide rails 20 in the width direction becomes gradually greater toward the front side.

Each of the guide rails 20 supports a sliding member X such that the sliding member X is movable in the longitudinal direction of the guide rail 20 (substantially in the front-rear direction). The movable panel 12 is connected to and supported by the two sliding members X while bridging the sliding members X. As the sliding members X move in the front-rear direction, the movable panel 12 operates to selectively open and close the opening 11 of the roof 10. Each of the sliding members X is displaced in the vehicle width direction in correspondence with the shape of the corresponding one of the guide rails 20.

The connection structure between each of the sliding members X and the movable panel 12 will hereafter be described.

Figure 2:
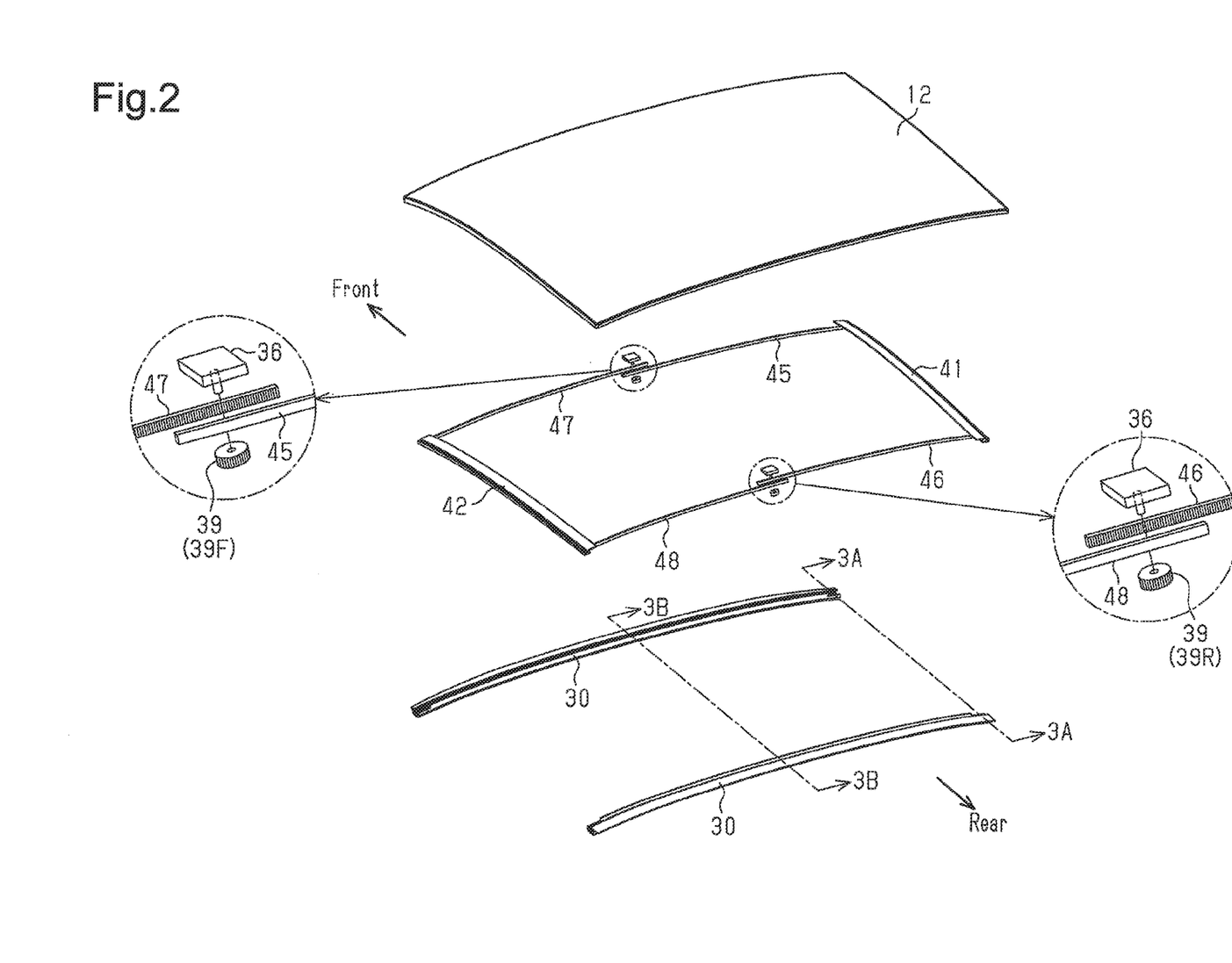
FIG. 2 is an exploded perspective view illustrating the sunroof device.
Figure 3A:
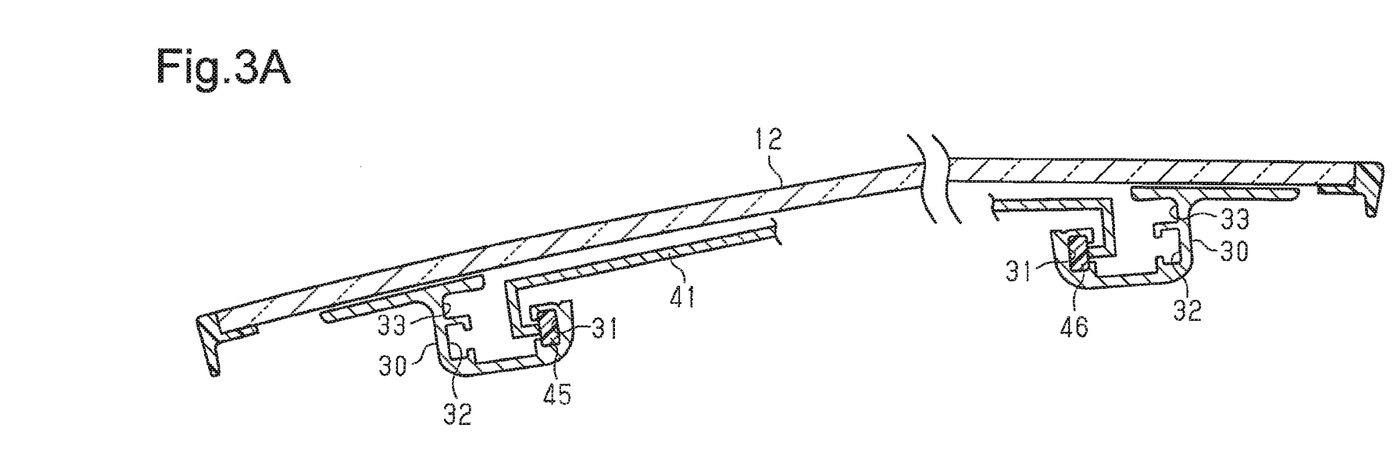
FIG. 3A is a cross-sectional view taken along line 3A-3A of FIG. 2.
Figure 3B:
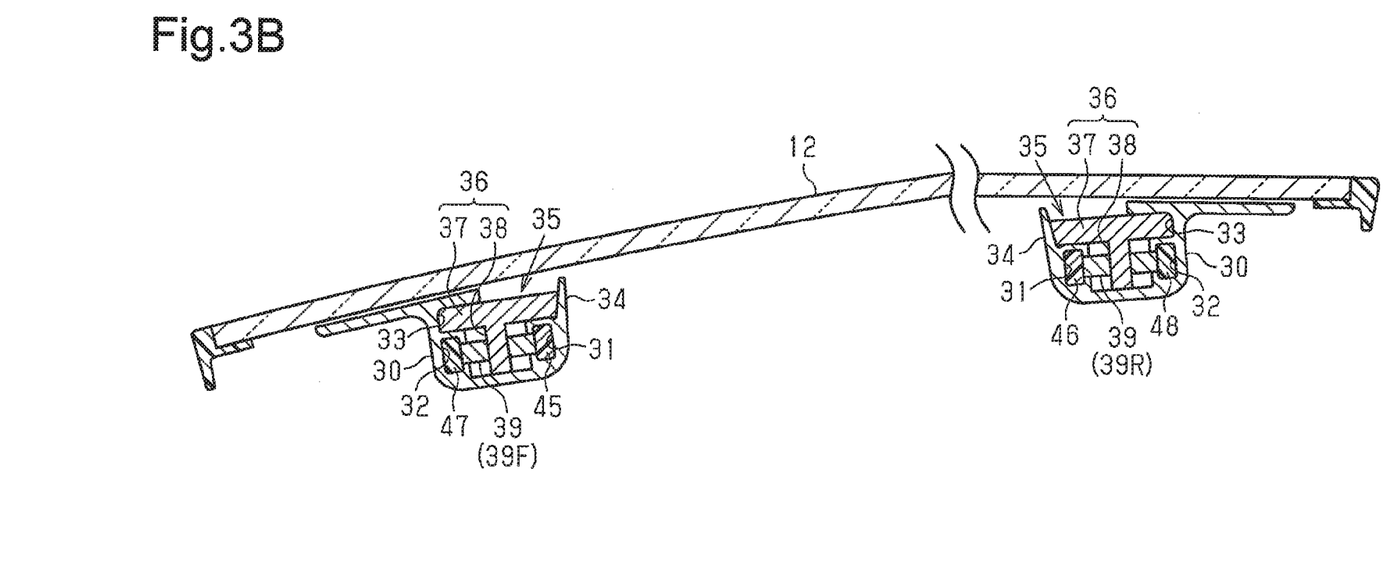
FIG. 3B is a cross-sectional view taken along line 3B-3B of FIG. 2.

As shown in FIGS. 2, 3A, and 3B, two substantially elongated support members 30 are arranged parallel to each other and attached to the lower surface of the movable panel 12. The support members 30 extend in the vehicle width direction along the front edge and the rear edge of the movable panel 12. The support members 30 are shaped symmetrically in the front-rear direction. Each support member 30 has a first guide groove 31 and a second guide groove 32 each having a substantially C-shaped cross section. The first guide groove 31 and the second guide groove 32 open to face each other while being spaced apart in the front-rear direction. Each support member 30 also has a support groove 33 having a substantially U-shaped cross section above the second guide groove 32. The support groove 33 opens toward the center of the movable panel 12. Each support member 30 further has a substantially claw-like support piece 34 in a middle section of the support member 30 in the vehicle width direction. The support piece 34 faces upward from the distal end of the support member 30 near the first guide groove 31 in the vicinity of the center of the movable panel 12. Each of the support pieces 34, together with the corresponding one of the support grooves 33, configures a shaft support portion 35.

Each of the shaft support portions 35 supports a fixed shaft 36. The fixed shaft 36 has a substantially rectangular plate-like base portion 37 and a substantially columnar shaft portion 38. The base portion 37 is fitted in the shaft support portion 35. The shaft portion 38 projects downward from the middle section of the base portion 37 between the first guide groove 31 and the second guide groove 32. The shaft portion 38 supports a substantially cylindrical pinion 39. The shaft portion 38 is arranged at the position that coincides with the positions of the first guide groove 31 and the second guide groove 32 in the height direction of the vehicle. The gear diameter of the pinion 39 is set such that the teeth of the pinion 39 enter the interiors of the first guide groove 31 and the second guide groove 32.

The front and rear ends of a substantially elongated first movable member 41, which extends substantially in the front-rear direction and serves as a movable member, are respectively attached to one end of corresponding one (the right ends as viewed in FIG. 2) of the two support members 30 to be movable in the vehicle width direction. Similarly, the front and rear ends of a substantially elongated second movable member 42, which extends substantially in the front-rear direction and serves as a movable member, are respectively attached to the other end of corresponding one (the left ends as viewed in the drawing) of the support members 30 to be movable in the vehicle width direction. The front ends and rear ends of the first and second movable members 41, 42 are coupled and fixed to the sliding members X of the guide rails 20. As a result, the first and second movable members 41, 42 are displaced in the vehicle width direction basically together with the sliding members X when the sliding members X move along the guide rails 20.

As shown in FIG. 3A, the front end and the rear end of the first movable member 41 are each bent toward the center of the movable panel 12 and enter the first guide groove 31 of the support member 30. The front end and the rear end of the second movable member 42 are each bent to the side opposite to the center of the movable panel 12 and enter the second guide groove 32 of the support member 30.

The front end of the first movable member 41 is coupled to a front-side rack gear 45. The front-side rack gear 45 is fitted in the first guide groove 31 of the front-side support member 30 to be movable in the vehicle width direction and serves as a front-side transmission member. The rear end of the first movable member 41 is coupled to a rear-side rack gear 46. The rear-side rack gear 46 is fitted in the first guide groove 31 of the rear-side support member 30 to be movable in the vehicle width direction and serves as a rear-side transmission member. Similarly, the front end of the second movable member 42 is coupled to a front-side rack gear 47. The front-side rack gear 47 is fitted in the second guide groove 32 of the front-side support member 30 to be movable in the vehicle width direction and serves as a front-side transmission member. The rear end of the second movable member 42 is coupled to a rear-side rack gear 48. The rear-side rack gear 48 is fitted in the second guide groove 32 of the rear-side support member 30 to be movable in the vehicle width direction and serves as a rear-side transmission member.

The two front-side rack gears 45, 47 are meshed with the pinion 39 arranged in the front-side support member 30 in such a state that the distance from the center of the movable panel 12 in the vehicle width direction to the front end of the first movable member 41 is equal to the distance from the aforementioned center to the front end of the second movable member 42. Hereinafter, the pinion 39 arranged in the front-side support member 30 will be referred to as a front-side pinion 39F serving as a front-side rotating body. Similarly, the two rear-side rack gears 46, 48 are meshed with the pinion 39 arranged in the rear-side support member 30 in such a state that the distance from the center of the movable panel 12 in the vehicle width direction to the rear end of the first movable member 41 is equal to the distance from the aforementioned center to the rear end of the second movable member 42. Hereinafter, the pinion 39 arranged in the rear-side support member 30 will be referred to as a rear-side pinion 39R serving as a rear-side rotating body.

Figure 4:
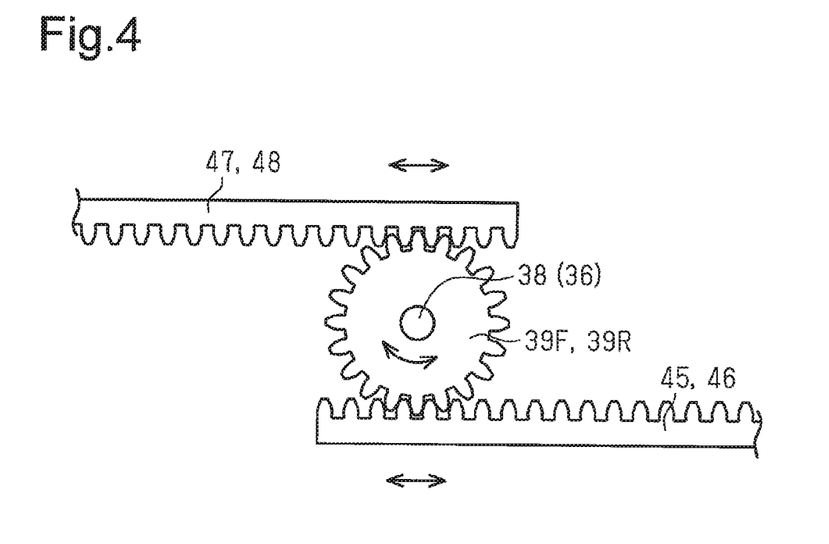
FIG. 4 is a plan view illustrating operation of the sunroof device.

As shown in FIG. 4, as the front-side pinion 39F rotates in one direction, the two front-side rack gears 45, 47 are both pushed outward. In contrast, as the front-side pinion 39F rotates in the other direction, the front-side rack gears 45, 47 are both retracted inward. Similarly, as the rear-side pinion 39R rotates in one direction, the two rear-side rack gears 46, 48 are both pushed outward. In contrast, as the rear-side pinion 39R rotates in the other direction, the rear-side rack gears 46, 48 are both retracted inward. That is, the two front-side rack gears 45, 47 are moved synchronously with each other in the vehicle width direction through rotation of the front-side pinion 39F. Also, the two rear-side rack gears 46, 48 are moved synchronously with each other in the vehicle width direction through rotation of the rear-side pinion 39R. In this manner, regardless of rotation of the pinion 39, the distance from the center of the movable panel 12 in the vehicle width direction to the front or rear end of the first movable member 41 is maintained equal to the distance from the aforementioned center to the front or rear end of the second movable member 42. Centering function is thus exerted. In other words, when the front or rear ends of the first and second movable members 41, 42 are displaced in the vehicle width direction, the corresponding pinion 39 rotates to maintain the state in which the distance from the center of the movable panel 12 in the vehicle width direction to the front or rear end of the first movable member 41 is equal to the distance from the aforementioned center to the front or rear end of the second movable member 42.

The present embodiment has the following advantages.

(1) As the two sliding members X slide along the guide rails 20, the first and second movable members 41, 42 move integrally. This moves the movable panel 12, to which the support members 30 supporting the first and second movable members 41, 42 are attached, to selectively open and close the front-side opening section 11a of the opening 11. At this time, the sliding members X are displaced in the vehicle width direction in correspondence with the shapes of the guide rails 20. However, the front and rear ends of the first and second movable members 41, 42 move in the vehicle width direction along the support members 30, thus absorbing the displacement of each sliding member X in the vehicle width direction. Particularly, the front ends of the first and second movable members 41, 42 are coupled to the front-side pinion 39F through the front-side rack gears 45, 47 in a state in which the distance from the center of the movable panel 12 in the vehicle width direction to the front end of the first movable member 41 is equal to the distance from the aforementioned center to the front end of the second movable member 42. Similarly, the rear ends of the first and second movable members 41, 42 are coupled to the rear-side pinion 39R through the corresponding rear-side rack gears 46, 48 in the state in which the distance from the center of the movable panel 12 in the vehicle width direction to the rear end of the first movable member 41 is equal to the distance from the aforementioned center to the rear end of the second movable member 42. This configuration restrains the displacement of the movable panel 12 in the vehicle width direction, even when, for example, the movable panel 12 receives external force in the vehicle width direction during its opening/closing operation. The center of the movable panel 12 in the vehicle width direction is thus maintained. That is, the movable panel 12 is maintained such that the center of the movable panel 12 coincides with the center of the roof 10 in the vehicle width direction. This limits the vibration of the movable panel 12 in the vehicle width direction. In addition, silent opening/closing operation of the movable panel 12 is ensured.

(2) As the front-side pinion 39F and the rear-side pinion 39R rotate, the free ends of the two front-side rack gears 45, 47 and the free ends of the two rear-side rack gears 46, 48 each selectively proceed and retreat, thus maintaining the center of the movable panel 12 in the vehicle width direction. In this case, increasing the rotation amount of each of the front-side pinion 39F and the rear-side pinion 39R increases the rotation amount of each of the front and rear ends of the first and second movable members 41, 42 in the vehicle width direction. This reduces the necessity of increasing the outer diameter of each of the front-side pinion 39F and the rear-side pinion 39R to increase the movement amount of each of the front and rear ends of the first and second movable members 41, 42. As a result, the installment of the sunroof device in the vehicle is facilitated.

(3) The first and second guide grooves 31, 32 of the front-side support member 30 are used as the front-side guides that guide movement of the two front-side rack gears 45, 47. Also, the first and second guide grooves 31, 32 of the rear-side support member 30 are used as the rear-side guides that guide movement of the two rear-side rack gears 46, 48. This decreases the number of components of the sunroof device, compared to a case in which the front-side guides or the rear-side guides are arranged independently from the support members 30. Further, the first and second guide grooves 31, 32 of the front-side support member 30 stabilize the postures of the front-side rack gears 45, 47. Similarly, the first and second guide grooves 31, 32 of the rear-side support member 30 stabilize the postures of the rear-side rack gears 46, 48.

(4) The locations of the two entire guide rails 20 are non-restricted by the minimum dimension Wm of the roof 10 in the vehicle width direction. This ensures an increased opening width of the opening 11. That is, the dimension of the roof 10 in the vehicle width direction is maximally reflected in the opening width of the opening 11. This enhances the feeling of openness experienced by the occupants of the vehicle.

(5) The axis of the front-side pinion 39F extends in the vehicle height direction. The two front-side rack gears 45, 47 are meshed with the rear portion and the front portion of the front-side pinion 39F, respectively. In this case, the front-side rack gears 45, 47 are arranged on the rear and front sides of the front-side pinion 39F, respectively. This limits the enlargement of the space for accommodating the front-side rack gears 45, 47 in the vehicle height direction. Similarly, the axis of the rear-side pinion 39R extends in the vehicle height direction. The two rear-side rack gears 46, 48 are meshed with the front portion and the rear portion of the rear-side pinion 39R, respectively. In this case, the rear-side rack gears 46, 48 are arranged on the front and rear sides of the rear-side pinion 39R, respectively. This limits the enlargement of the space for accommodating the rear-side rack gears 46, 48 in the vehicle height direction.

The above-illustrated embodiment may be modified as follows.

Figure 5:
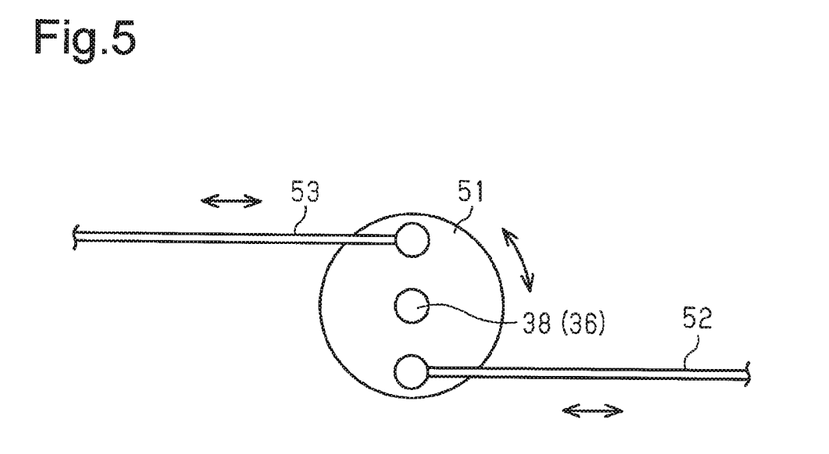
FIG. 5 is a plan view illustrating the configuration and operation of a modification of the sunroof device.

As shown in FIG. 5, the front-side pinion 39F and the front-side rack gears 45, 47, which are meshed with the front-side pinion 39F, may be replaced by the configuration described below. That is, a rotating body 51 and two transmission rods 52, 53 may be employed. The rotating body 51 is supported by the shaft portion 38 and serves as a substantially disk-like front-side rotating body. The transmission rods 52, 53 are coupled to the rotating body 51. Each of the transmission rods 52, 53 is formed by, for example, a metal bar. An end of each of the transmission rods 52, 53 is fixed to the front end of corresponding one of the first and second movable members 41, 42. The other end of each transmission rod 52, 53 is pivotally coupled to the outer peripheral portion of the rotating body 51. The coupling portions of the transmission rods 52, 53 with respect to the rotating body 51 are located on the opposite sides of the shaft portion 38 in the radial direction. That is, the positions of the coupling portions are set such that the distance from the center of the movable panel 12 in the vehicle width direction to the front end of the first movable member 41 is equal to the distance from the aforementioned center to the front end of the second movable member 42.

In this case, as the rotating body 51 rotates in one direction, the two transmission rods 52, 53 are both pushed outward. In contrast, as the rotating body 51 rotates in the other direction, the transmission rods 52, 53 are both retracted inward. That is, regardless of rotation of the rotating body 51, this maintains the state in which the distance from the center of the movable panel 12 in the vehicle width direction to the front end of the first movable member 41 is equal to the distance from the aforementioned center to the front end of the second movable member 42.

Also, the rear-side pinion 39R and the two rear-side rack gears 46, 48, which are meshed with the rear-side pinion 39R, may be replaced by a rotating body 51 and transmission rods 52, 53 that are similar to the above-described corresponding components.

This modification achieves advantages similar to the advantages (1) and (4) of the above-described embodiment.

As long as at least parts of the guide rails 20 are non-parallel to each other, the guide rails 20 may be, for example, S-shaped or arcuate. In either case, it is preferable that the guide rails 20 be both arranged at the outermost positions in the roof 10 in the vehicle width direction.

Each shaft portion 38 (each fixed shaft 36) may be arranged integrally with the corresponding support member 30.

The sunroof device may have a plurality of front-side pinions 39F. That is, the front-side pinions 39F may be meshed with each of the front-side rack gears 45, 47 such that the front-side rack gears 45, 47 are engaged with each other at multiple positions. Similarly, the sunroof device may have a plurality of rear-side pinions 39R. That is, the rear-side pinions 39R may be meshed with each of the rear-side rack gears 46, 48 such that the rear-side rack gears 46, 48 are engaged with each other at multiple positions. In either case, it is more preferable that the front-side pinions 39F or the rear-side pinions 39R be arranged symmetrically in the vehicle width direction.

A front-side guide that guides movement of the front-side rack gears 45, 47 may be arranged independently from the front-side support member 30. Similarly, a rear-side guide that guides movement of the rear-side rack gears 46, 48 may be arranged independently from the rear-side support member 30. Also, each pinion 39 or fixed shaft 36 may be fixed to, other than the corresponding support member 30, the front portion or the rear portion of the movable panel 12 or any component that operates integrally with the aforementioned front or rear portion.

Each pinion 39 or fixed shaft 36 may have an axis that extends in the front-rear direction. In this case, the front-side rack gears 45, 47 or the rear-side rack gears 46, 48 only need to be respectively meshed with one and the other of the upper portion and the lower portion of the pinion 39.

The opening-closing operation of the movable panel 12 may employ an inner-sliding style, in which the movable panel 12 slides while being maintained in a tilt-down state.

The invention claimed is:

1. A sunroof device comprising:
two guide rails, which are arranged in opposite edges of an opening formed in a roof of a vehicle in a width direction of the vehicle such that at least parts of the guide rails are non-parallel with each other;
two sliding members, which are slidable along the guide rails;
two support members, which are respectively attached to a front portion and a rear portion of a movable panel that selectively opens and closes the opening;
movable members, each of which is fixed to one of the sliding members, wherein each of the movable members has a front end and a rear end that are supported by the corresponding one of the support members to be movable in the vehicle width direction;
a front-side rotating body and a rear-side rotating body, which are respectively rotationally supported by the front portion and the rear portion of the movable panel;
two front-side transmission members, each of which has an end fixed to a front end of one of the movable members and another end coupled to the front-side rotating body such that distances from a center of the movable panel in the vehicle width direction to the respective front ends of the two movable members are equal to each other; and
two rear-side transmission members, each of which has an end fixed to a rear end of one of the movable members and another end coupled to the rear-side rotating body such that distances from the center of the movable panel in the vehicle width direction to the respective rear ends of the two movable members are equal to each other.

2. The sunroof device according to claim 1, wherein
the front-side rotating body and each of the front-side transmission members are a front-side pinion and a front-side rack gear that is meshed with the front-side pinion, respectively, and the rear-side rotating body and each of the rear-side transmission members are a rear-side pinion and a rear-side rack gear that is meshed with the rear-side pinion, respectively.

3. The sunroof device according to claim 2, wherein
one of the two support members is used as a front-side guide that guides movement of the two front-side rack gears, and
the other one of the support members is used as a rear-side guide that guides movement of the two rear-side rack gears.

4. The sunroof device according to claim 2, wherein
an axis of the front-side pinion extends in a height direction of the vehicle,
the two front-side rack gears are respectively meshed with the front-side pinion on a front side and a rear side in the vehicle,
an axis of the rear-side pinion extends in the height direction of the vehicle, and
the two rear-side rack gears are respectively meshed with the rear-side pinion on a front side and a rear side in the vehicle.

5. The sunroof device according to claim 1, wherein
the two front-side transmission members are two front-side transmission rods, which are coupled to an outer peripheral portion of the front-side rotating body at positions on opposite sides of an axis of the front-side rotating body in a radial direction, and
the two rear-side transmission members are two rear-side transmission rods, which are coupled to an outer peripheral portion of the rear-side rotating body at positions on opposite sides of an axis of the rear-side rotating body in a radial direction.

* * * * *